K. V. BENNIS.
VEHICLE BUMPER.
APPLICATION FILED JULY 8, 1915.
1,189,343.
Patented July 4, 1916.
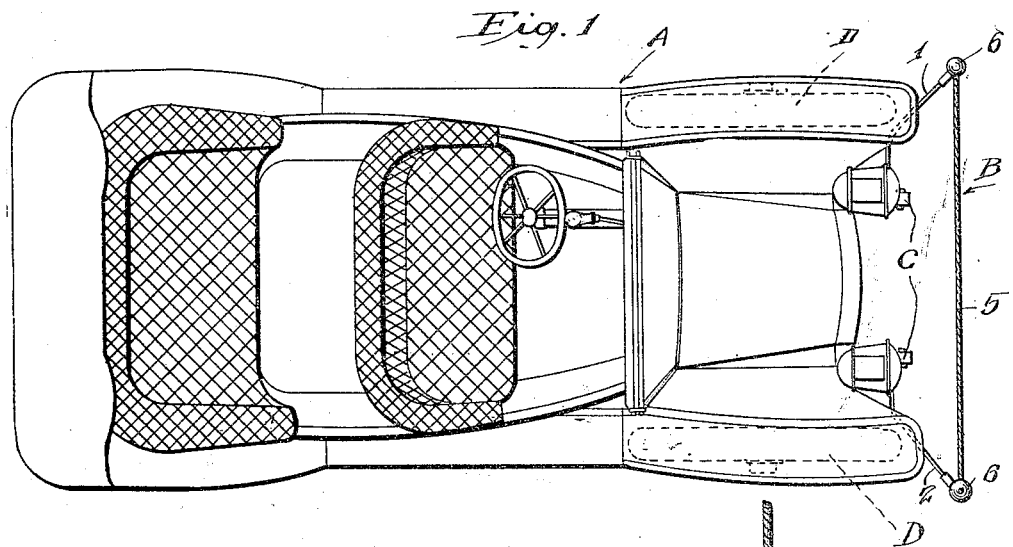
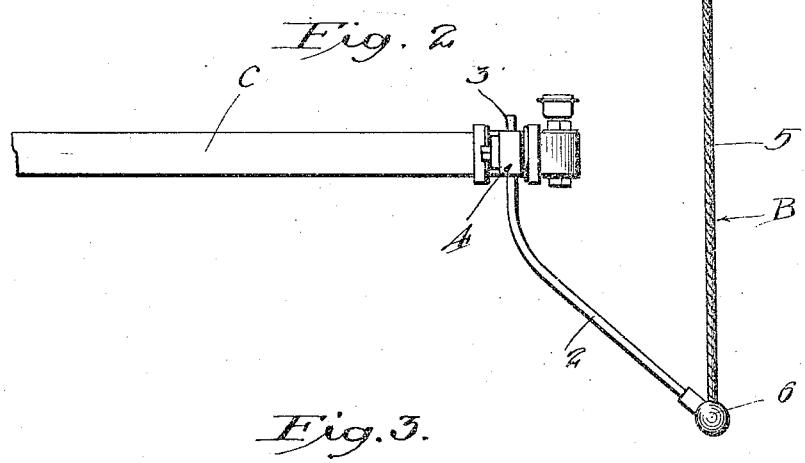
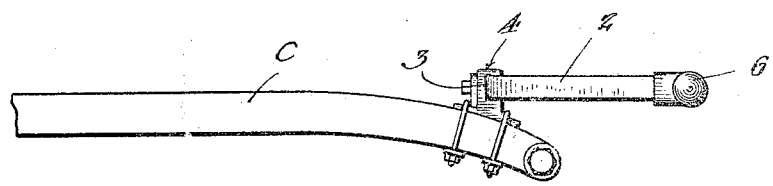
Witnesses:
Inventor
Karl V Bennis
By Frederick Whyers
Atty

UNITED STATES PATENT OFFICE.

KARL VUCASSOVICH BENNIS, OF LOS ALAMITOS, CALIFORNIA.

VEHICLE-BUMPER.

1,189,343.   Specification of Letters Patent.   Patented July 4, 1916.

Application filed July 8, 1915. Serial No. 38,686.

*To all whom it may concern:*

Be it known that I, KARL V. BENNIS, a citizen of the United States, residing at Los Alamitos, in the county of Orange and State of California, have invented a new and useful Vehicle-Bumper, of which the following is a specification.

Automobile bumpers now in general use comprise horizontal metal bars which are yieldably supported across the front or rear of automobiles and said bars have their ends curved inwardly toward the wheels. The curved ends form hooks which often catch upon objects near the curbing when backing out from the curbing and result in the bending or breaking of the curved ends. The curved ends are also broken or bent when one automobile in passing another engages one of the ends rearwardly thereof, no provision being made in most bumpers to allow the bars to yield when struck in this manner. The said bars are also non-flexible and cause breakage, scratching and other injury because of their stiff non-flexible qualities.

My invention relates to improvements in bumpers of the character described and I eliminate the hereinbefore described objectionable features by substituting for the customary metal non-flexible bars a flexible member comprising a rope or cable which is supported on opposite sides of the automobile by spring members, said spring members each extending in front of a wheel and being relatively yieldable, the shape of said spring members being such that they have no tendency to catch upon objects encountered thereby but will yield when struck from either the front or rear thereof.

Another object is to simplify and generally improve bumpers of the character described so as to render them easy and inexpensive to manufacture and capable of being quickly and easily attached to automobiles of various kinds.

The invention consists in certain novel features of construction and combinations, and arrangement of parts as will be more fully hereinafter described and pointed out in the claims.

The accompanying drawings illustrate the invention.

Figure 1 is a top plan view of an automobile equipped with my bumper; Fig. 2 is an enlarged fragmentary plan view; and Fig. 3 is a side elevation of the bumper showing it attached to an automobile.

Referring to the drawings, A designates an automobile to which my improved bumper B is attached. The bumper is attached to the forward springs C of the automobile or to any other suitable part thereof and comprises spring arms 1 and 2 which are bowed and extend outwardly and forwardly from the automobile. The arms are secured as at 3 at their inner ends by suitable fastening means 4 to the springs C and extend in front of the wheels D.

Secured at its ends to the outer ends of the arms 1 and 2 is a flexible member 5 which is located between the arms in a horizontal plane and designed to encounter an object directly in the path of an automobile. The free ends of the arms 1 and 2 have round knobs 6 thereon, so that an object to one side of the automobile when struck will not be injured and will cause the arm which it encounters to give, inwardly toward the automobile, or outwardly as the case may be. The flexible member may be a steel rope or other cable and is secured in any suitable manner to the arms 1 and 2.

Should the arm 2, for example, strike an object it will give and pull upon the flexible member 5, thus bringing into play the spring action of the other arm 1 and providing a stiff yielding action which will take up the jar occasioned. Should the flexible member hit an object squarely the direct action of both spring arms is brought into play. By employing a flexible element instead of a non-flexible metal bar less chance of injury to the object struck is had.

In having the spring arms 1 and 2 curved outwardly and inwardly and connected at their ends with a flexible member there is offered no non-yielding parts or hook portions which would have a tendency to catch upon objects encountered thereby and result in the derangement of the device. Sharp ends are eliminated by the use of the round knob 6. The combination of a flexible bumper member with relatively yieldable spring arms for supporting the member results in the provision of a bumper which is highly flexible and yieldable but sufficiently stiff to prevent injury to the object struck or to the automobile to which it is attached or itself.

While I have shown the bumper attached to the front of an automobile, it is to be understood that it may be as readily attached to the rear of an automobile and that it will operate effectively when in such position.

In practice I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in construction, proportion and arrangement of parts may be resorted to when required without sacrificing any of the advantages of my invention as set forth in the appended claims.

I claim:

1. The combination with a vehicle, of a spring arm secured to opposite sides thereof and being curved outwardly and forwardly relative to the vehicle in front of the wheels thereof, the free ends of said arms being enlarged and rounded, and a flexible member connected with said enlarged and rounded free ends and extending across the front of the vehicle.

2. In a vehicle bumper the combination with a vehicle, of spring arms secured to the vehicle, and a one-piece flexible member secure at its ends to and held taut between the arms.

3. In a vehicle bumper the combination with a vehicle, of curved spring arms, each secured at one end rigidly to the vehicle, and a one-piece horizontal flexible member secured at its ends to and held taut between the other ends of the arms.

4. In a vehicle bumper the combination with a vehicle, of curved spring arms, each secured at one end rigidly to the vehicle, said arm extending in front of the wheels of the vehicle and outwardly to one side of the wheels, and a horizontal one-piece flexible member rigidly secured at its ends to the outer ends of the arms and held taut between the arms.

In testimony whereof, I have hereunto set my hand at Los Angeles, California, this 3rd day of July, 1915.

KARL VUCASSOVICH BENNIS.

In presence of—
L. Belle Weaver,
Chas. J. Chinns.